Figure 1:
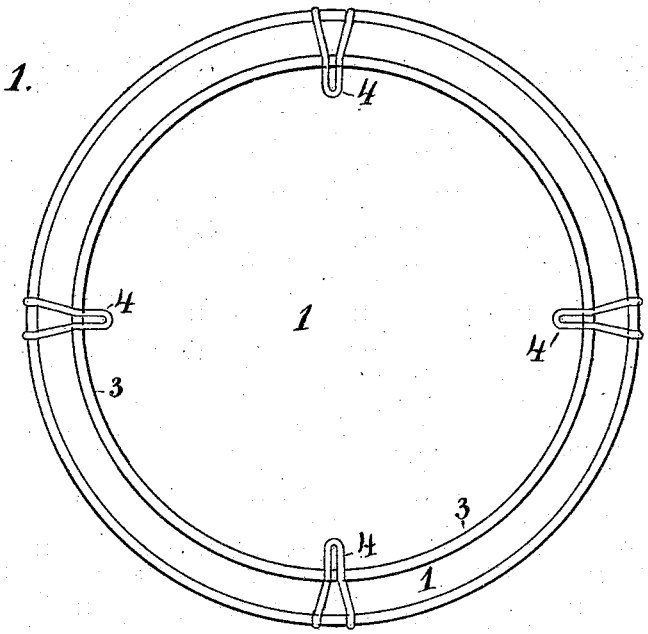

(No Model.)

I. E. BROWN.
BAKING TIN.

No. 373,124. Patented Nov. 15, 1887.

Witnesses:
Betsey A. Johnson
George N. Brown

Inventor.
Jona E. Brown
per Reuben L. Chase
Attorney.

UNITED STATES PATENT OFFICE.

IONA E. BROWN, OF MOUNT HOLLY, ASSIGNOR TO MARY M. MAGUIRE AND EMMA A. MAGUIRE, OF RUTLAND, VERMONT.

BAKING-TIN.

SPECIFICATION forming part of Letters Patent No. 373,124, dated November 15, 1887.

Application filed June 21, 1886. Serial No. 205,830. (No model.)

*To all whom it may concern:*

Be it known that I, IONA E. BROWN, a citizen of the United States, residing at Mount Holly, in the county of Rutland and State of Vermont, have invented certain new and useful Improvements in Baking-Tins, of which the following is a description.

The object of my invention is to provide a baking-tin, as an article of manufacture, which is easily kept clean, and from which delicate cakes, confectionery, and pastry can be removed without breaking or injury being done to the same. I attain this object by the arrangement and combination of parts illustrated in the drawings accompanying my said application, in which—

The first view, Figure 1, represents the flat bottom of the baking-tin 1, with a wire surrounding the same inserted in the outer edge thereof, with the adjustable rim 3 3 set thereon and held in place by the hooks 4 4 4 4. This view shows my baking-tin as looked upon from the top.

Figure 2:
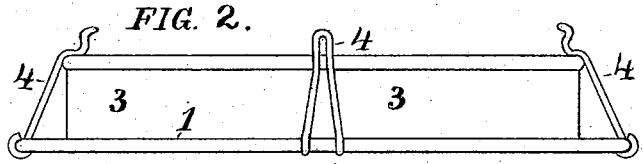

The second view, Fig. 2, gives a side view, and represents the baking tin set up ready for use. In this view 1 represents the flat bottom surrounded by a wire inserted in the outer edge thereof; 3 3, the adjustable rim set upon said flat bottom; 4 4 4, the hooks that hold said rim in place upon the bottom.

Figure 3:
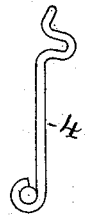

The third view, Fig. 3, represents one of the hooks 4 which hold the rim 3 upon the bottom of the baking-tin 1.

Figure 4:
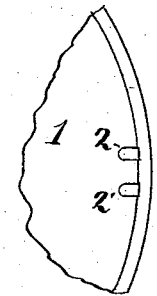

The fourth view, Fig. 4, represents a section or part of the flat bottom 1, showing the slots 2 2 in which the hook 4 is hinged upon the wire in the outer edge of the flat bottom 1.

Similar figures refer to similar parts throughout the several views, and the terms Fig. 1, Fig. 2, Fig. 3, and Fig. 4 refer to the several views.

The wire is inserted in the outer edge of the bottom 1, and the metal of the bottom is clasped around the wire and rolled firmly upon it. The hooks 4 4 4 4 are inserted in the slots 2 2 in the flat bottom 1, and hinged upon the wire in its outer edge, and are of sufficient length to clasp and hold in place the adjustable rim 3 3. The rim 3 3 is set upon the flat bottom 1 inside the slots 2 2, and is held firmly in place by the hooks 4 4 4 4, and when so set up and adjusted the cake, confectionery, or pastry is baked therein as in a common baking-tin.

To remove the baked material from the tin the hooks are unclasped from the rim and thrown back, leaving the rim free from the bottom, so that it may be removed from the cake, confectionery, or pastry without breaking or injuring it.

Each of the parts may be readily cleaned when separated.

What I claim, and desire to secure by Letters Patent of the United States, is—

The combination of a flat bottom, the hinged hooks, and detachable rim held in position upon the flat bottom by the hooks, substantially as set forth, and for the purpose specified.

In testimony whereof I affix my signature in presence of two witnesses.

IONA E. BROWN.

Witnesses:
GEORGE N. BROWN,
FANNIE W. COLE.